Oct. 11, 1949.　　　　E. B. SCHWENK　　　　2,484,357
FISHLINE SINKER

Filed Oct. 14, 1946

INVENTOR
Earl B. Schwenk
BY
Fred C. Matheny
ATTORNEY

Patented Oct. 11, 1949

2,484,357

UNITED STATES PATENT OFFICE 2,484,357

FISHLINE SINKER

Earl B. Schwenk, Seattle, Wash.

Application October 14, 1946, Serial No. 703,212

2 Claims. (Cl. 43—52)

This invention relates to a fish line sinker and particularly to means for connecting such a sinker to a fish line.

An object of this invention is to provide a fish line sinker of simple and efficient construction which may be very quickly and easily attached to or detached from a fish line without requiring the fish line to be threaded through any holes in the sinker.

Another object is to provide a fish line sinker having detachable clips by which it may quickly and easily be connected with or disconnected from a fish line.

Another object is to provide a sinker having fish line holding and guiding means that is well adapted to cooperate with friction type line gripping means of the form employed in so called "slip sinkers" in which the line is released from the grip of the sinker by the pull of a fish, leaving the sinker free to slide down along the line as the line is reeled in.

Another object of this invention is to provide means for attaching a sinker to a fish line in such a manner that the sinker will be shaken clear of the line and dropped if a fish that is capable of shaking and jerking the line violently is hooked.

Another object is to provide a fish line sinker that has a relatively smooth external surface and is free from projecting parts that are liable to become snagged when the sinker is in use or tangled with other fishing tackle with which the sinker is carried when not in use.

In fishing for salmon and like fish it is common practice for fishermen to carry sinkers of a plurality of different weights and sizes and to change these sinkers frequently on the line to vary the trolling depth until the best depth at which to fish is ascertained. As the fish will often change their depth, the sinkers must be changed frequently and my sinker facilitates quick and easy change without removing the hooks and leaders. Also sinkers of this type are usually slidably mounted on the line at a considerable distance, such as ten to thirty feet, from the hooks and are attached to the line by friction clamp means which will be released by the strike or pull of a fish and permit the sinker to slide down the line toward the hooks. This allows the line to be reeled in until the hooks are substantially at the end of the pole. My line guiding means is particularly well adapted for use on slip sinkers that are changed frequently on the line and that release their grip on the line when a fish strikes and slide down toward the hook.

Other objects of my invention will be apparent from the following description taken in connection with the accompanying drawings.

In the drawings Figure 1 is a side elevation of a fish line sinker constructed in accordance with this invention showing a fish line operatively connected therewith.

Like reference numerals designate like parts throughout the several views.

Figure 1:
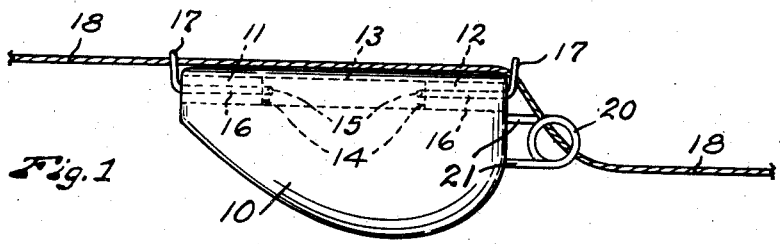
Figure 2:
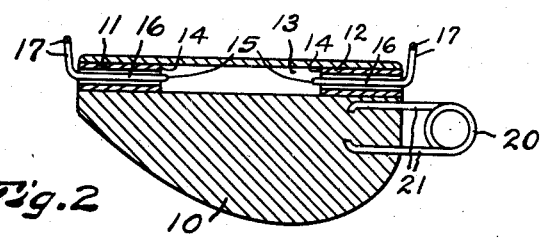
Fig. 2 is a longitudinal sectional view of the sinker.

In the drawings 10 designates a sinker body of any desired shape formed of heavy material, such as lead or lead alloy. Two short tubular socket members 11 and 12, preferably formed of non-corrosive material harder than the sinker body, such as brass or bronze, are embedded in opposite end portions of the sinker body. One preferred way of incorporating these tubular socket members 11 and 12 into the sinker body is to provide a tubular passageway 13 that extends entirely through the sinker body 10 and to press the tubular socket members 11 and 12 tightly into the end portions of this passageway 13. Obviously two passageways could be provided for the respective socket members 11 and 12 instead of providing the single continuous passageway 13. Also the socket members 11 and 12 could be embedded in the sinker body 10 at the time said sinker body is molded or cast.

The socket members 11 and 12 are embedded in the sinker body in such a manner as to leave the inner end portions of these socket members clear and unobstructed so that these inner end portions will form shoulders 14. These shoulders 14 are adapted to be engaged by the outwardly directed inclined end portions 15 of line holding clips 16. Each line holding clip 16 is provided with an eye portion 17 for the reception of a fish line 18. The eye portion 17 of each line holding clip 16 is positioned substantially at right angles to the remainder of the clip. Each line holding clip may be formed of a piece of non-corrosive spring wire bent substantially double and having the tip portions 15 bent outwardly at an incline and the eye portion 17 bent substantially perpendicularly to the shank or arms 16 of the clip.

Figure 4:
Fig. 4 is a detached perspective of a clip of slightly modified form that may be used to connect a fish line to the sinker in such a manner that the sinker can be shaken free of the line.

The tip portions 15 are bent outwardly at less than right angles to the portions 16 of the clips so that these tip portions 15 will engage firmly enough with the shoulders 14 to prevent detachment of the clips from the sinker when the sinker is in use but will permit the clips to be disengaged from the sinker body by exerting a firm outward pull on the clip. By varying the incline of the tip portions 15 it is possible to vary their holding action as respects the shoulders 14. Also by using only one outwardly bent tip portion on one arm of each clip, as shown in Fig. 4, and leaving the other arm of said clip straight it is possible to provide a clip that is more easily detached and that will shake loose from the sinker body more easily. This is sometimes desirable, as hereinafter explained.

A spring clip means for frictionally engaging and releasably holding a fish line 18 is provided at one end of the sinker body 10. This spring clip comprises a closed coil 20 of spring wire of substantially one and one-half turns positioned adjacent one end of the sinker body 10 and having its two end portions 21 embedded in said sinker body 10. When the line 18 is drawn between the coils of the spring clip 20, as shown in Fig. 1, it will be frictionally held thereby. The hooks are secured to the end of that portion of the line to the right of the sinker in Fig. 1 and the pole to the other portion of said line. When a fish is hooked the pull of the fish on the line 18 will ordinarily pull the line out of the clip 20 and leave the sinker free to slide down on the line so that when the line is reeled in the hooks may be drawn close to the end of the pole.

Figure 3:
Fig. 3 is a detached perspective view of a clip that may be used to connect a fish line to the sinker.

In the use of this sinker the line guiding clips, Figs. 3 and 4, are easily applied to a portion of the line remote from the ends of the line by passing the line between the arms 16 of these clips into the eye portion 17 thereof. After two of these line guiding clips have been correctly applied to a line 18 a sinker of any desired weight may quickly and easily be applied to said line by inserting the clips into the two tubes 11 and 12 in the sinker. The clips are easily detached from the tubes 11 and 12 by grasping the line on both sides of the clip in one hand and simultaneously exerting a pull and a twist on the clip. Thus the sinkers on a line may be changed at will without removing the line guiding clips from the line.

The line guiding clips are carried by the line and will not drop off of the line but can easily be removed therefrom by pulling the line outwardly by way of the passageway between the two arms 16 of the clips.

The line holding clips 15, 16, 17 are quickly and easily applied to or detached from a fish line 18 without flattening or pinching or in any way injuring the line. After these line holding clips are on a line they may be quickly and easily engaged with or disengaged from a sinker body. The eye members 17 form smooth line guides that will not cut or injure the line.

Figure 5:
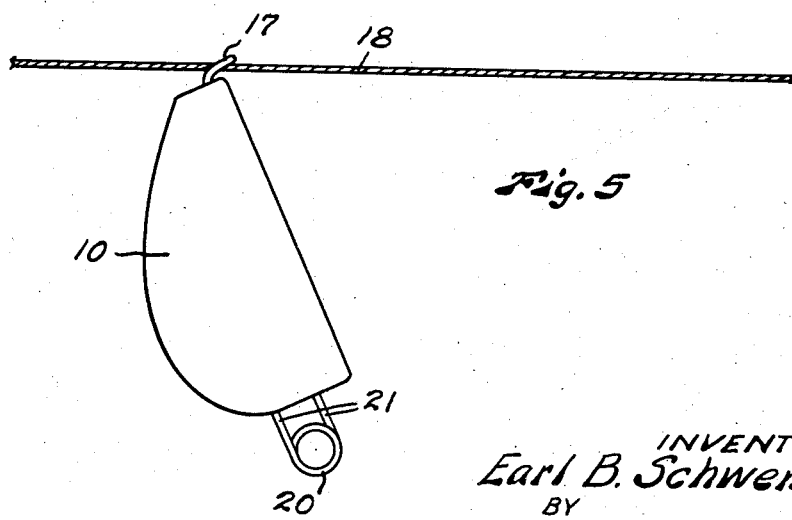
Fig. 5 is an elevation showing this sinker connected with a fish line in such a manner that the sinker can be shaken loose from the line by violent shaking or jerking of the line.

In some instances a fisherman may wish to have the sinker shake loose from the line in the event he securely hooks a large fish. To rig up the sinker for this mode of operation the fisherman omits the line guiding clips at the end of the sinker body nearest the spring clip 20 and uses, at the other end of the sinker body, an easily detachable line guiding clip, such as a clip of the type shown in Fig. 4. When a fish becomes hooked on a line having a sinker thus attached the first hard pull or strike will usually pull the line 18 free of the spring clip 20. This will allow the sinker to run down the line 18 to a point close to the fish and will leave the sinker hanging by one readily detachable line holding clip, as shown in Fig. 5. From this position the sinker is easily shaken free of the line in the event of further violent shaking or jerks exerted by the fish. In this method of procedure the sinker is sacrificed but the line is relieved of the weight of said sinker and the landing of the fish is thereby facilitated.

Obviously changes in the construction of this fish line sinker may be made within the scope and spirit of the following claims.

I claim:

1. A fish line sinker comprising a sinker body; two tubular socket members embedded in said sinker body at opposite ends thereof, the inner end portions of said socket members being unobstructed so as to provide shoulders; two line guiding clips applicable to portions of a fish line removed from the ends of the line, each line guiding clip comprising a piece of doubled spring wire having at its doubled end an eye portion disposed substantially at right angles to the remainder of said clip and having at its other end at least one out turned inclined portion, said line guiding clips fitting said socket members and said out turned inclined portions releasably engaging with the shoulders formed by the ends of said socket members to thereby releasably attach said line guiding clips to said sinker body; and friction type fish line gripping means attached to one end portion of said sinker body.

2. A fish line sinker comprising a sinker body having a tubular passageway extending lengthwise therethrough; two tubular socket members secured in said passageway at opposite ends of said sinker body, the inner end portions of said socket members forming shoulders; two line guiding clips applicable to portions of a fish line removed from the ends of the line, each line guiding clip comprising a piece of doubled spring wire having at its doubled end an eye portion disposed substantially at right angles to the remainder of said clip and having at its other end at least one out turned inclined portion, said line guiding clips fitting said socket members and said out turned inclined portions engaging with the shoulders formed by the ends of said socket members to thereby releasably attach said line guiding clips to said sinker body.

EARL B. SCHWENK.

REFERENCES CITED

The following references are of record in the file of this patent:

UNITED STATES PATENTS

| Number | Name | Date |
| --- | --- | --- |
| 1,564,147 | Stickley et al. | Dec. 1, 1925 |
| 1,778,119 | Neville | Oct. 14, 1930 |
| 2,326,876 | Miller | Aug. 17, 1943 |
| 2,399,298 | Sevegny | Apr. 30, 1946 |